(12) United States Patent
Porter

(10) Patent No.: US 6,475,615 B2
(45) Date of Patent: Nov. 5, 2002

(54) WEATHERABLE COATING AND STAIN SYSTEM FOR THERMOSET OR THERMOPLASTIC COMPOSITE SURFACES

(75) Inventor: Cem A. Porter, Garrett, IN (US)

(73) Assignee: TT Technologies, Inc., Maumee, OH (US)

( * ) Notice: Subject to any disclaimer, the term of this patent is extended or adjusted under 35 U.S.C. 154(b) by 0 days.

(21) Appl. No.: 09/752,186

(22) Filed: Dec. 29, 2000

(65) Prior Publication Data

US 2001/0049405 A1 Dec. 6, 2001

Related U.S. Application Data

(62) Division of application No. 09/027,525, filed on Feb. 23, 1998, now Pat. No. 6,201,057.

(51) Int. Cl.[7] .............................. B32B 27/40; E06B 3/70
(52) U.S. Cl. .................... 428/334; 428/335; 428/423.1; 428/425.1; 428/537.1; 52/19; 52/455; 52/515
(58) Field of Search ............................ 52/19, 455, 515; 428/334, 335, 423.1, 425.1, 537.1

(56) References Cited

U.S. PATENT DOCUMENTS

| | | |
|---|---|---|
| 4,509,981 A | 4/1985 | Sanders et al. |
| 4,598,120 A | 7/1986 | Thoma et al. |
| 4,616,064 A | 10/1986 | Zukosky et al. |
| 4,872,867 A | 10/1989 | Joh |
| 4,913,972 A | 4/1990 | Grunewalder et al. |
| 4,923,760 A | 5/1990 | Adkins et al. |
| 5,169,888 A | 12/1992 | Sales |
| 5,288,805 A | 2/1994 | Kodali |
| 5,342,882 A | 8/1994 | Gobel et al. |
| 5,432,233 A | 7/1995 | Miyazoe et al. |
| 5,537,789 A | 7/1996 | Minke et al. |
| 5,693,715 A | 12/1997 | Kodali |
| 5,840,806 A | 11/1998 | Komazaki et al. |
| 5,948,849 A * | 9/1999 | Porter ........................ 524/501 |
| 6,120,852 A * | 9/2000 | Porter ........................ 427/417 |

OTHER PUBLICATIONS

The Detroit Society for Coatings Technology, L. Price et al., "Cure Behavior of Silicone–Expoxies and Urethane Modified Acrylates in Interpenetrating Polymer Networks," *1994 Constituent Society Paper*, Oct. 13, 1994, New Orleans, La., pp 65–72.

Chen et al., "Epoxy Silanes in Reactive Polymer Emulsions", *Journal of Coatings Technology*, vol. 69, No. 875, Dec. 1997.

* cited by examiner

*Primary Examiner*—Peter Szekely
(74) *Attorney, Agent, or Firm*—Brooks & Kushman P.C.

(57) ABSTRACT

A stain/topcoat system for non-porous thermoset and/or thermoplastic articles comprises a pigmented stain, and a topcoat comprising one or more non-siloxane film-forming polymers, an emulsion of one or more curable organopolysiloxanes, a weatherability agent having a functional group that is reactive with carboxylate functional sites and water. The topcoat displays exceptional adhesion and weatherability to pigmented stained surfaces.

11 Claims, No Drawings

WEATHERABLE COATING AND STAIN SYSTEM FOR THERMOSET OR THERMOPLASTIC COMPOSITE SURFACES

This is a divisional of application Ser. No. 09/027,525 filed on Feb. 23, 1998, now U.S. Pat. No. 6,201,057.

FIELD OF THE INVENTION

The present invention pertains to weatherable coating systems suitable for application to thermoset or thermoplastic composite surfaces having minimal surface porosity. More particularly, the present invention pertains to a topcoat, and to a stain and topcoat system which can be easily applied by the consumer to produce an aesthetic, weatherable surface, particularly on exterior doors and door entry components.

BACKGROUND OF THE INVENTION

Conventional finishing methods for exterior doors and door system components, where a traditional finely finished wood grain appearance is desired, have involved staining a bare wood surface with dye and/or pigment-bearing stains followed by application of one or more coats of exterior varnish. A seal coat is sometimes applied prior to the stain and topcoat to seal the pores of the wood and to promote a more adherent and uniform stain and topcoat. The stain is virtually always solvent borne, as water based stains have the effect of raising the grain, thus requiring an intermediate sanding step which is labor and time intensive. In addition to the solvent contained in the stain, stains contain drying oils as carriers, for example heat-bodied linseed oil. Generally, several different oils are provided to promote penetration of the stain into the wood surface.

After the stain has dried, one or more transparent topcoats are applied. Traditional topcoats are varnishes containing dissolved resins such as copal, often in conjunction with a drying oil. More recently, chemically modified natural resins and synthetic polymers have replaced all or part of natural resins, especially for outdoor use. In addition, to provide superior weatherability, ultraviolet absorbers have been added. Despite the advances made in such finishes, varnishes still generally require light sanding or abrading with steel wool or the like between coats, or necessitate the addition of the second coat prior to the full drying of the previous coat. Otherwise, delamination between varnish coats may occur. Sanding and similar treatments are time consuming, and judging the proper time to apply a second coat onto a not fully-cured prior coat requires some skill and experience. Despite these drawbacks, stain/varnish systems continue to be used on exterior door systems.

Recently, high quality exterior door systems employing molded thermoset and/or thermoplastic composite skins have become commercially available. These door systems are compression molded to exhibit a wood grain appearance, and when properly finished, are difficult to distinguish from natural wood doors. These composite doors offer several advantages over natural wood products, such as freedom from warpage, lower cost, greater insulation efficiency, and the like. Unfortunately, the stain/varnish systems in use for finishing natural wood doors are only marginally acceptable for composite doors. A satisfactory finish may often be achieved under production conditions where skilled workers, sophisticated spray equipment, drying ovens and the like are available. However, such systems are ill-suited for application by the consumer.

The difference between the ease with which finishes may be applied to natural wood products on the one hand and composite exterior door systems on the other, is due to the nature of the materials involved. Natural wood is a porous and absorbent product. Hence, dyes may penetrate the wood fibers as well as into the wood pores. The latter may also serve to trap and retain pigment, as may partially abraded fibers generated in sanding the wood prior to finishing. However, composite door skins are constructed of sheet molding compound (SMC) or other thermoset or thermoplastic matrices, often containing fillers which may range from wood flour to finely ground minerals and/or glass fibers. Despite the presence of fillers, the composite door skins are essentially non-porous. Thus, stains containing dyes as the colorant are largely ineffectual, and pigmented stains require a higher amount of pigment than would be required for a conventional wood stain. The lack of porosity and the generally smooth surface of such products require the stain pigments to be physically adhered to the surface.

Furthermore, the drying oils used in conventional stains, particularly those of lower viscosity, act as subsurface emollients in wood, but remain as an exterior thin film on composite skins. Lower molecular weight oils, being unable to penetrate the essentially non-porous surface, may remain tacky or require lengthy drying times or oven cure. During weathering due to light exposure, these oils experience scission of naturally occurring unsaturated molecular sites. The scission produces a variety of lower molecular weight, liquid and often volatile components, which causes the subsequently applied topcoat to blister, coming off in sheets.

The detrimental effects of drying oil vehicles may be minimized by substituting quickly evaporating solvents such as mineral spirits, naphtha, or the like. However, such stains tend to dry rapidly, leaving application marks, i.e., "brush marks" where overlapping coats of stain are applied. Elimination of drying oil components results in little adherence of pigment to the surface. This minimal adherence may be acceptable in porous products, but is highly problematic when non-porous surfaces are involved.

Adkins, et al., in U.S. Pat. No. 4,923,760, discloses water-borne emulsions employing two different maleinized linseed oils together with cosolvents such as propylene glycol tertiary butyl ether and a variety of hydrocarbons. However, such stains are still formulated for porous wood surfaces and are not well suited to non-porous composite door skins. Lowering the amount of the oil vehicles would be appropriate, but the stains then dry too fast and have only a limited capacity to stably disperse pigment.

Pigmented stains, whether solvent-borne or water borne, are traditionally protected by aromatic polyurethane topcoats. When the previously deposited stain contains low levels of scissionable drying oils, failure by blistering and peeling is substantially minimized. However, aromatic polyurethanes are subject to severe degradation by light. Exposure to sunlight causes degradation which ultimately results in ablative loss of the coating when applied to non-porous surfaces. Polyurethane varnishes often contain sacrificial ultra-violet (UV) protectants. However, the ultraviolet light protection package is typically consumed in as few as eight months exposure to sunlight. As the stain coat is not strongly adhered to non-porous substrates, failure of the topcoat results in ablative loss of the stain layer, typically in less than two months after the topcoat is breached.

Aqueous topcoats have been used with some success, as indicated by the disclosures of U.S. patents to Gobel et al. (U.S. Pat. No. 5,342,882) and Sanders et al. (U.S. Pat. No. 4,509,981). Water-based topcoats employing aliphatic urethane-acrylic latexes are commercially available. The use of a non-sacrificial UV protectant package in these coating compositions provides a substantial increase in durability of underlying resin-bound solid pigmented coating relative to the degree of protection provided by aromatic polyurethane finishes. However, these finishes are incompatible with pigmented stains having little or no resin binder and high pigment loading. This incompatibility is believed due to the relative differences between the somewhat hydrophilic pigment particles and the hydrophobic topcoat.

It would be desirable to provide a pigmented stain suitable for use on relatively non-porous thermoset and thermoplastic composite surfaces, particularly door skins. It would be further desirable to provide such pigmented stains in a formulation which can easily be applied by the consumer in a uniform manner, without resort to the use of expensive and not readily available production equipment. It would be yet further desirable to provide a topcoat which is compatible with the pigmented stain, and which exhibits a high, continuing degree of ultraviolet protection and weathering resistance. The stain/topcoat system should not employ two-component coatings with limited pot life.

SUMMARY OF THE INVENTION

The present invention pertains to a weatherable stain and topcoat system which is highly effective to stain and weatherize thermoset and/or thermoplastic, essentially non-porous surfaces. The system comprises a pigmented stain and an aqueous, essentially transparent topcoat which is compatible with the stain. The stain/topcoat system provides a finish system which is suitable for consumer application, and which, following application, presents a highly aesthetic, weatherable surface.

DESCRIPTION OF THE PREFERRED EMBODIMENTS

The pigmented stain of the present invention contains a high loading of pigments necessary to impart the degree of coloration required for non-porous thermoset and/or thermoplastic composite materials, particularly door skins, trim, etc., and a specific resin binder, in a solvent system which preferably employs a tail vehicle in addition to conventional fast drying solvents. The resin binder is a dicyclopentadiene-modified drying oil as disclosed by U.S. Pat. No. 5,288,805, herein incorporated by reference, and commercially available as DILULIN™ copolymer resins from Cargill, Inc. It has been surprisingly found that one copolymer resin is adequate not only to provide the requisite adhesion of pigment to substrate, but also, in conjunction with the formulation of the topcoat, to allow for the use of large amounts of pigment in the stain without compatibility problems. Thus, it is preferred that the dicyclopentadiene-modified drying oils constitute the largest part, and preferably all or substantially all of the resin binder.

The dicyclopentadiene-modified drying oil is preferably prepared by reacting dicyclopentadiene in an amount of from about 10 weight percent to about 40 weight percent with a drying oil or mixture of drying oils having relatively high iodine numbers, preferably above 150, and more preferably in the range of 170 to 195. Linseed oil is the preferred drying oil, however other oils such as tung oil, dehydrated castor oil, and other oils may be used as well, or in admixture with linseed oil. The dicyclopentadiene is added to the drying oil in small increments at relatively high temperature, i.e., 250–270° C. with stirring. It is believed that the dicyclopentadiene is converted to cyclopentadiene which then reacts with the unsaturated sites of the drying oils in a Diels-Alder reaction. The preparation of such modified oils and their use with oil-modified polyurethanes in polyurethane varnish is disclosed in U.S. Pat. No. 5,288,805.

The dicyclopentadiene-modified linseed oil is present in the stain in an amount of from about 20 weight percent to about 45 weight percent, more preferably 30 to 40 weight percent, and most preferably about 32 to 38 weight percent. The pigment loading is present in the stain from about 15 weight percent to about 35 weight percent of the stain, more preferably 20 weight percent to about 30 weight percent, and most preferably about 25 to 30 weight percent. Solvents are present in the stain in amounts of about 20 weight percent to 40 weight percent of the stain, more preferably 25 to 35 weight percent, and most preferably about 30–35 weight percent. Of the total solvents, approximately 10 weight percent to about 30 weight percent, preferably 15 weight percent to about 25 weight percent are slowly evaporating solvents commonly known as "tail solvents." The remainder of the solvents exhibit fast to moderate evaporation, such as mineral spirits, naphtha, solvent 142 petroleum distillate, and the like. It is preferred to use combinations of these faster evaporating solvents such that the solvents flash off at different intervals. The majority of solvent, i.e., >50%, should flash off within a period of from 2 to 10 minutes. Most preferably, solvent 142 petroleum distillate, mineral spirits, and tridecyl alcohol tail solvent are employed in a weight ratio of about 10:10:5, with the weight ratio of dicyclopentadiene-modified linseed oil to tail solvent being approximately 3:1.

In addition to pigments, dicyclopentadiene-modified linseed oil, and solvents, the stain may contain other known additives, for example, leveling agents; drying agents, i.e., metal naphthenates such as cobalt naphthenate, calcium naphthenate, and magnesium naphthenate; ultraviolet absorbers, preferably of the non-sacrificial type, i.e., hindered amine stabilizers such as TINUVIN® 292 and TINUVIN® 328; wax; thickeners such as various clay minerals; and the like. The stain is preferably free of ordinary drying oils such as unmodified or bodied linseed oil, tung oil, and the like; and is preferably also free of other secondary resins such as urethane resins and oil-modified alkyd polymers.

The preparation of the stain is not overly critical, and may be performed by conventional paint preparation techniques. For example, the pigments, in standard commercial grade, are added to a first portion of the dicyclopentadiene-modified linseed oil and well blended in a mixing tank, three roll mill, Cowles mixer, etc. Sand milling or ball milling may also be used. In some cases, pigment size reduction is desired in addition to full wetting of the pigment-surface. A surfactant such as BYK™ 156 may aid in dispersing and wetting the pigment with the resin binder. Following wetting of the pigment and any desired size reduction, the resulting mill base is diluted with solvent, additional resin added, and various driers, leveling agents, thickeners, and the like are added. Blending of the mixture is continued until a uniform dispersion is obtained.

The stain may be applied to the non-porous thermoset and/or thermoplastic composite by conventional means, i.e., by brushing, spraying, sponging, rolling, wiping, and the like. In general, excess stain is removed by wiping with a clean lint free rag or the like, but preferably by means of a china bristle brush. The stain is generally applied at temperatures between 5° C. and 45° C., and should be allowed to dry for approximately 48 hours at room temperature under dry conditions. Drying time may be adjusted depending upon the temperature and humidity. After the stain is dry, the topcoat may be applied.

The topcoat exhibits unexpectedly excellent compatibility with the inventive stain layer, particularly so in view of the fact that the topcoat is an aqueous composition. In addition, the topcoat exhibits unexpectedly excellent durability with regard to abrasion resistance and damage caused by ultraviolet light.

The topcoat comprises a non-siloxane, film-forming polymer comprising an acrylic polyurethane polymer latex. The term "latex" as used herein pertains to an emulsion, microemulsion, or dispersion of the respective polymer as a discontinuous phase in water as a continuous phase. The particle size is not overly critical, and may vary, for example, from smaller than 0.001 μm to about 2 μm or larger, preferably from about 0.01 μm to about 0.5 μm. While the dispersed phase should remain stably dispersed in the continuous phase, if the dispersed phase settles or separates, it should be readily redispersible by means of simple agitation, as by stirring or the use of a paint mixer or the like. Latexes with small particle sizes are preferred. By the term "dispersible" as it applies to the non-siloxane, film-forming polymer, is meant that the polymer may be dispersed or emulsified in water to form a latex as that term is used herein.

Most preferably, the acrylic polyurethane polymer latex is a FLEXTHANE® urethane-modified acrylate resin latex, available from Air Products, of Allentown, Pa. The pH of the latex must be suitable for the dispersed phase, and is preferably between 8 and 11, adjusted by addition of suitable acid or alkaline additives, particularly with ammonium hydroxide. FLEXTHANE® 620 is particularly preferred as the acrylic polyurethane polymer latex.

The topcoat composition may contain conventional additives such as cosolvents, leveling agents, flatting agents, emulsifiers and emulsion stabilizers, biocides, thickeners, suspending agents, and in particular, ultraviolet protection additives. Examples of suitable cosolvents include the various glycol ethers and acetates available from the Dow Chemical Company under the tradename DOWANOL® glycol ethers and acetates. Aliphatic alcohol cosolvents such as methanol, ethanol, n-propanol, 2-propanol, n-butanol, 2-ethylhexanol, tridecyl alcohol, and the like may be used, as can also ketones such as methylethylketone, 2-pentanone, cyclohexanone; and aliphatic and aromatic hydrocarbons. The latter may be used in quantities such that stable emulsions may be maintained.

The key to the compatibility of the topcoat with the stain, and one of the keys to the improved durability of the topcoat, however, is due to the presence of an organopolysiloxane emulsion, preferably a microemulsion containing one or more curable or crosslinkable organopolysiloxanes. The presence of this microemulsion is believed to alter the hydrophobicity of the topcoat, rendering the latter compatible with the stain formulation of the present invention. Although organopolysiloxane microemulsions are preferred for use herein, stable emulsions containing larger particle sizes are useful as well.

The organopolysiloxanes in the microemulsion are curable organopolysiloxanes which are readily available. Such curable organopolysiloxanes have reactive functional groups such as alkoxy, silanol, chloro, hydrido, acetoxy, and the like. The functional groups may be terminal groups or may be distributed along the polysiloxane chain. Preferably, the average functionality of the organopolysiloxanes is greater than two such that a crosslinked thermoset polymer is obtained upon cure. However, lower functionality organopolysiloxanes are also suitable, so long as the improved topcoat weatherability is maintained. Suitable organopolysiloxanes are identified in U.S. Pat. No. 4,913,972, which is herein incorporated by reference.

A preferred organopolysiloxane microemulsion is Wacker BS® 43A methylsilicone resin microemulsion, available from Wacker Silicones, of Adrian, Mich.

Organopolysiloxanes which contain unsaturated organic groups such as allyl-, vinyl-, vinylether, and other unsaturation-functional groups are also useful. These organopolysiloxanes may further crosslink under the influence of light exposure.

The term "curable" includes resins which are crosslinkable as well. The term "curable" is intended to reflect a curing reaction which creates a higher molecular weight cured polymer as compared to the molecular weight of the uncured organopolysiloxane. By the term "molecular weight" is meant number average molecular weight.

In addition to the curable organopolysiloxane, the topcoat may contain other organopolysiloxanes which promote water beading. These organopolysiloxanes may be curable, may be essentially inert, or may interact with other system components such as the film-forming polymer either by chemical reaction or polar or ionic attraction. Examples of water beading agents are trimethylsiloxy end-capped polydimethysiloxanes, α,ω-dihydroxypolydimethylsiloxanes, and in particular, amino-functional organopolysiloxanes, for example α,ω-[3-aminopropyl]polydimethylsiloxanes. A preferred beading agent is Wacker Silicones® BS 1306 organopolysiloxane, available from Wacker Silicones.

The key to the unexpectedly excellent durability of the topcoat with regard to abrasion resistance and damage caused by ultraviolet light, however, is due to the presence of an aqueous weatherability agent. Without wishing to be bound to any particular theory, it is believed that the weatherability agent reacts with the acrylic polyurethane polymer latex, the organopolysiloxane microemulsion, or both to increase the durability of the topcoat by at least 20% over a similar topcoat not containing the weatherability agent. More particularly, and while still wishing not to be bound to any particular theory, it is believed that the aqueous weatherability agent reacts with carboxylate functional sites in the acrylic component of the urethane-acrylic hybrid polymer resulting in a crosslinking reaction between the aqueous weatherability agent and the acrylic component of the urethane-acrylic hybrid polymer. For this reason the weatherability agent could also be considered a "crosslinking agent" and is preferably chosen so as to have a functional group that is relatively reactive with carboxylate functional sites. The term "carboxylate functional sites" include carboxylic acids and derivatives of carboxylic acids, such as carboxylic acid salts.

Aqueous weatherability agents may be used in the form of aqueous or partially aqueous dispersions, suspensions, emulsions, or solutions containing weatherability agents chosen from a list of agents that could perform nucleophilic substitutions, and which would preferably have two functional groups or bonding sites to participate in a crosslinking reaction. Preferably, the weatherability agent has only one oxirane functional group, however, the weatherability agent could also have more than one oxirane functional group as long as the viscosity of the agent remains relatively low.

Preferred weatherability agents that are reactive with carboxylate functional sites are the following: aqueous aliphatic epoxy dispersions, most preferably aqueous aliphatic epoxy emulsions such as Chempol® 020-1642, which is available from Cook Composites, Inc. of Kansas City, Mo.; aziridines, and preferably trifunctional aziridines; epoxides and compounds containing blocked isocyanate groups, preferably with aliphatic or cycloaliphatic backbones, which have been tailored to be compatible with water through means known in the art; alcohols, including glycols and polyols; epoxy resins such as tetraglycidyl-methylenedianiline and bisphenol A diglycidyl ether; and divalent metals with weakly bonded ligand complexes which are soluble in polar solvents miscible with water, preferably zirconium(II) acetate or zirconium(II) propionate.

The topcoat preferably contains, in weight percent, from about 30 to about 55 percent water, preferably from about 35 to about 50 percent water, and more preferably from about 40 to about 50 percent water; from about 20 to about 50 percent of an acrylic polyurethane polymer latex, preferably from about 30 to about 45 percent, and more preferably from about 30 to about 40 percent; from about 2 to about 25 percent of an organopolysiloxane emulsion, preferably from about 3 to about 10 percent, and more preferably from about 3 to about 8 percent; from about 1 to about 25 percent of a weatherability agent, preferably from about 5 to about 20 percent, and more preferably from about 10 to about 15 percent; and sufficient surfactant to provide a stable dispersion, preferably from about 1 to about 8 percent, more preferably from about 1 to about 5 percent, and most preferably from about 2 to about 4 percent. The term "weight percent", as used in the previous sentence with respect to the latex, the emulsion and the weatherability agent, refers to the total weight of the latex, the emulsion and the weatherability agent, respectively, used in formulating the topcoat and not to the weight percents of the solids or polymers used in the latex, emulsions, or weatherability agent. The surfactants may be anionic, cationic, amphoteric, or non-ionic. Mixtures of various surfactants may be used. The type of surfactant should be tailored to the type of polymer latex. The selection of suitable surfactants is within the skill of the art once the general formulation is known.

The acrylic polyurethane polymer latex preferably contains in weight percent from about 20% to about 60% solids, and preferably from about 37% to about 40%, based on the weight of the latex. The organopolysiloxane emulsion preferably contains in weight percent from about 20% to about 60% solids, and preferably from about 42% to about 46%, based on the weight of the emulsion. The aqueous weatherability agent preferably contains in weight percent from about 40% to about 60% solids, more preferably from about 49% to about 51%, and most preferably about 50%, based on the weight of the weatherability agent.

In addition to the above ingredients, the topcoat preferably contains an ultraviolet protection package. This package may contain one or more ultraviolet absorbers, preferably of the non-sacrificial type. Examples are titanium dioxide, silica, and various ceramic materials. Such UV absorbing particles may be used in amounts up to about 5 percent by weight, based on the weight of the topcoat, preferably from about 0.1 weight percent to about 2.5 weight percent, and more preferably about 0.2 weight percent to about 1.8 weight percent.

The UV absorbing particles are preferably passivated, very finely ground anatase or rutile titanium dioxide having a mean particle size of about 20 nm (nanometers). Even though the passivated anatase or rutile titanium dioxide is very finely ground, a number of particles could exist having a particle size about 80 nm, and thus, it may still be opaque and could diminish the translucency of the topcoat. Thus, it is preferred that the very finely ground anatase or rutile titanium dioxide be present in an amount of from about 0.12 weight percent, based on the weight of the topcoat, to about 1.2 weight percent, and more preferably in an amount of about 0.12 weight percent. It is contemplated that a greater amount of passivated anatase or rutile titanium dioxide could be used, such as in an amount of from about 0.12 weight percent, based on the weight of the topcoat, to about 2.5 weight percent, and more preferably in an amount of about 1.8 weight percent, if the opacity of the titanium dioxide were reduced by employing passivated anatase or rutile titanium dioxide having a relatively narrow particle size distribution which would exclude all but a minimal amount of opaque particles. The preferred particle size of the passivated anatase or rutile titanium dioxides is 20 nm, plus or minus 10 nm.

The titanium dioxide is passivated to prevent the titanium dioxide from attacking the carbon atoms present in the other components of the topcoat. The choice of passivating coating for the translucent rutile titanium dioxide and some methods of application are known in the art. Selection of the passivating coating salts is determined by color and pigment wetting requirements in the formulation. Calcium mixed fatty acid carboxylate derivatives are most preferred, such as OM GROUP® 5 percent Calcium Hydro-Cem, which is available from Mooney Chemicals Inc., of Cleveland, Ohio.

In addition to finely divided inorganic particle UV absorbers, soluble or dispersible organic absorbers such as hindered amines, cinnamic acid esters, and the like may be used, generally in amounts up to about 5 weight percent, based on the weight of the topcoat, more preferably 0.1 to about 3 weight percent, and most preferably from about 0.5 to about 2 weight percent. Preferred UV absorbers are the various TINUVIN® absorbers available from Ciba Geigy.

The stain/topcoat system of the present invention displays excellent weatherability, as measured by ASTM G53–88 accelerated weathering test. Moreover, the topcoat itself, even when used over conventional oil-based stains on a porous surface, also displays excellent weatherability. The weatherability of both the stain/topcoat system, and the topcoat by itself, should exceed 3500 hours minimally by the above test on a non-porous surface, should preferably exceed 4000 hours, more preferably 4500 hours, and most preferably exceeds 5000 hours.

The preparation of the aqueous topcoat may be performed in numerous ways. However, the addition of the organopolysiloxane microemulsion must be accomplished in such a manner so as to prepare a stable microemulsion. Simply adding the entire amount of organopolysiloxane microemulsion at one time is generally ineffectual. It has been found advantageous to prepare a mill base containing the acrylic polyurethane polymer latex and other non-siloxane additives and utilize water or a portion of the mill base to form a organopolysiloxane microemulsion "preblend." The preblend is then added to the remaining portion of the mill base to form a "main topcoat mixture".

The preblend is added to the remaining portion of the mill base in slow continuous or incremental additions with modest agitation such that the total addition takes place over a period of 25 minutes to 10 hours, preferably 40 minutes to 6 hours. When incremental addition is utilized, it has been found advantageous to add up to about 8 percent by weight of the preblend, more preferably 0.5 to 2.5 weight percent of the preblend at each increment, the increments spaced approximately 1–5 minutes apart, more preferably a minimum of 2 minutes, and most preferably 3 minutes apart.

Thus, with 2.5 weight percent increments spaced 3 minutes apart, the entire addition of preblend to mill base will take approximately 2 hours. The preblend preferably consists of 20–80 weight percent organopolysiloxane microemulsion and 80–20 weight percent water and/or mill base, more preferably 30–65% organopolysiloxane microemulsion, and most preferably about 40–60% organopolysiloxane microemulsion, the remainder preferably being mill base and/or water.

Within a week prior to application of the topcoat, the aqueous weatherability agent is added to and mixed with the main topcoat mixture to form the topcoat of the present invention.

The topcoat is preferably applied as two or more layers with a total dry thickness of 10–150 $\mu$m, preferably 13–75 $\mu$m, and more preferably 30–60 $\mu$m. The topcoat is preferably applied at ambient temperatures in the 5° C. to 45° C. range, with three hours passing between coat applications. While the topcoat is preferably applied over a pigmented stain on a non-porous thermoset and/or thermoplastic surface, the inventive topcoat may be applied to other surfaces devoid of stain, and to porous surfaces, stained or unstained, as well.

The preferred non-porous surface to which the stain and topcoat of the present invention is applied is a compression molded thermoset and/or thermoplastic composite skin which comprises an outerface of an exterior door. The compression molded skin may preferably comprise a modified unsaturated polyester sheet molding compound, such as, acid modified propylene glycol maleate, a low profile additive, such as polyvinyl acetate, condensation reaction catalyst, filler and chopped fiberglass reinforcement. Examples of suitable exterior doors having suitable compression molded thermoset and/or thermoplastic composite skin are identified in U.S. Pat. No. 5,537,789, which is incorporated herein by reference.

Performance in the early stages of product life of the topcoat may be enhanced by further drying or heating the applied coating, once it is dry to the touch, at a temperature of about 30° C.–121° C., preferably 65° C.–121° C., for approximately 15 minutes. Performance can be measured by coating softening resistance during solvent rubs with methyl ethyl ketone rubs using test method ASTM D5402-93. Acceptable performance herein means greater than 100 rubs, preferably greater than 200 rubs. When no heat is applied, the curing of the topcoat to maximum hardness occurs over several months. Without heat, the topcoat is suitable for normal service handling within six hours after applying two coats of topcoat.

Having generally described this invention, a further understanding can be obtained by reference to certain specific examples which are provided herein for purposes of illustration only and are not intended to be limiting unless otherwise specified.

EXAMPLE 1

A preferred inventive topcoat formulation is as follows:

A mill base is prepared in a small container in a high shear mixer set at 2000 rpm using a high speed dispersant blade such as a Cowles blade. Add 750 g of about 20 nm particle size translucent rutile titanium dioxide such a TITAN® L181; and 750 g of passivating coating, such as 5 weight percent calcium mixed neopentyl $C_9$–$C_{13}$ fatty acid carboxylate, preferably OM GROUP® 5 percent Calcium Hydro-Cem in approximately 8 L of clean water. The mixture is sheared for 30 minutes. After shearing, a flatting agent such as LOVEL® 27 is added, the quantity of which is dependent on the finish desired: flat, satin, semi-gloss, or glossy. Other adjuvants include Theological aids, such as synthetic clays for consistency, preferably 800 g of LAPONITE® clay; surfactants such as 1625 g of BYK® 024 defoamer, and/or 425 g of BYK® 181; and anti-marring waxes such as SHAMROCK® S-381, the amount which is determined by the product performance requirement, preferably 650 g.

The mill base is transferred to a larger tank and the remaining non-polysiloxane materials are blended in under high shear conditions. Approximate additions are as follows: 160 kg of non-siloxane film-forming polymer latexes, such as urethane-acrylic hybrid polymer resin latex FLEXTHANE® 620; surfactants such as 1.1 kg of BYK® 321, and 2.8 kg of BYK® 346; hindered amine stabilized ultraviolet light stabilizers such as 725 g of TINUVIN® 292; anti-fungal and anti-microbial adjuvants such as 500 g of POLYPHASE® P-20-T and 380 g of PROXEL® GXL; as well as 1.4 kg co-solvent such as tridecyl alcohol.

A 20 L hydrophobicity-modifying organopolysiloxane microemulsion preblend is prepared at 50–1000 rpm using a Cowles blade in a high shear mixer. The maximum agitation is determined by the shear sensitivity of the particular curable organopolysiloxane resins, while the minimum speed is determined by economics of manufacture. About 10 L of the main topcoat mixture described above is withdrawn, or, as an alternative, water may be used to prepare the preblend. Solvents such as those used in topcoat preparation may not be used as they fail to mix without detrimental dispersion texture. Over a minimum period of about 20 minutes, continuous or incremental additions of main topcoat mixture or water are added to the hydrophobicity-modifying preblend containing such as 9.6 kg of curable organopolysiloxane microemulsion, such as, Wacker Silicones® BS 43A. Adjuvant water-beading agents such as 125 g of amino-functional organosiloxane, for example Wacker Silicone® 1306 organopolysiloxane, are added as part of the preblend.

The organopolysiloxane-containing hydrophobicity-modifying preblend is added to the main topcoat mixture in continuous or incremental additions at a rate of about 1–160 mL, preferably 50 mL; or up to 8 volume percent of the preblend; spaced a minimum of 2, preferably 3 minutes apart. The result is the organopolysiloxane-modified main topcoat mixture which, while immediate use is preferred, may be transferred to an air-tight storage container for up to approximately three years, depending upon environmental conditions, with temperature being the most important. A preferred storage temperature is 10–30° C.

Within a week prior to application of the topcoat, an aqueous weatherability agent, preferably one having a polymeric moiety and a functional group which is reactive with carboxylate functional sites, such as 1.5–4.5 L (about 10–30 kg), preferably 1.5 L, of aqueous aliphatic epoxy dispersions, such as CHEMPOL® 020-1642 is added to the 30 L total organopolysiloxane-modified main topcoat mixture. The mixture is well stirred with a drum mixing device, such as a Lightnin® mixer.

EXAMPLE 2

In this example, CHEMPOL® 020-1642 aqueous aliphatic epoxy emulsion is added to three other formulations and compared against the formulation of Example 1.

In Comparative Example C1, CHEMPOL® 020-4301 acrylic resin, which is recommended by Freeman Polymer Division as the best resin to work with CHEMPOL® 020-1642 aqueous aliphatic epoxy emulsion, is blended with CHEMPOL® 020-1642 aqueous aliphatic epoxy emulsion.

In Comparative Example C2, CHEMPOL® 020-4301 acrylic resin is blended with WACKER SILICONES® BS 43A organopolysiloxane microemulsion and further blended with CHEMPOL® 020-1642 aqueous aliphatic epoxy emulsion.

In Comparative Example C3, the sample is essentially identical to the preferred formulation of Example 1, except that no CHEMPOL® 020-1642 aqueous aliphatic epoxy emulsion is added.

A sample of each of the topcoats of Example 1 and Comparative Examples C1–C3 are brush applied to a stained FIBER-CLASSIC® door skin. The samples are allowed to air dry.

All four samples are subjected to accelerated aging using a QUV® Weatherometer with UV B313 bulbs and a test cycle of 4 hours exposure to UV light at 60° C. followed by 4 hours exposure to condensation at 50° C. This test follows ASTM G53–88.

TABLE 1

| Component | Example 1 | Comparative Example C1 | Comparative Example C2 | Comparative Example C3 |
|---|---|---|---|---|
| Flexthane ® 620 urethane-acrylic hybrid polymer resin latex | X | | | X |
| Wacker Silicones ® 43A Organopolysiloxane microemulsion | X | | X | X |
| Chempol ® 020-4301 Acrylic Resin | | X | X | |
| Chempol ® 020-1642 Aqueous Aliphatic Epoxy emulsion | X | X | X | |
| Hours to Failure | 5200–6200 | 1900 | 1900 | 3400 |

X-indicates that the topcoat of the respective Example contains a quantity of the component on the left side of the table.

The topcoat of Comparative Example C1, which comprises an acrylic resin and an aqueous aliphatic epoxy emulsion, failed in 1900 hours. Adding an organopolysiloxane to the topcoat of Comparative Example C1 did not change the hours to failure of the topcoat of Comparative Example C2 relative to the topcoat of Comparative Example C1. The topcoat of Comparative Example C3, which comprises a urethane-acrylic resin latex and the same organopolysiloxane microemulsion used in Comparative Example C2, failed in 3400 hours, which represents almost an 80% increase over the topcoats of Comparative Examples C1 and C2. By adding the same aqueous aliphatic epoxy emulsion used in Comparative Example C1 to the topcoat of Comparative Example C3, the weatherability of the topcoat of Example 1 is extended to 5200–6200 hours. This represents an increase of at least 170% the topcoats of Comparative Examples 1 and 2, and an increase of at least 53% over the topcoat Comparative Example 3.

Without being bound to any particular theory, it is believed that the weatherability agent increases the topcoats resistance to damage caused by ultraviolet light by reacting with the carboxylate functional sites on the acrylic portion of the urethane-acrylic hybrid polymer thereby decreasing the available supply of oxygen free radicals.

EXAMPLE 3

In this example, the hardness and softening resistance of coatings are compared. Comparative Example C4 is prepared by applying two thin films totaling about 100 µm thickness of the topcoat described in Comparative Example C3. The topcoat is applied to a previously stain coated sample of Fiber-Classic® door skin. The door skin is a representative of the class of relatively non-porous composite thermoset surfaces used in plastic building products. The application is by typical paint brush application. The film is allowed to air dry at room temperature for 60 days.

Example 2 is prepared in an identical method to, and to an identical substrate as, Comparative Example C4, except the topcoat of Example 2 is the same topcoat described in Example 1 herein.

Both samples, Comparative Example C4 and Example 2, are treated by double rubbing methyl ethyl ketone following method ASTM D5402-93. Failure is defined as a breakthrough to the stain layer. The hardness of the film was assessed before and after 60 double rubs of methyl ethyl ketone using pencil hardness according to ASTM D3363-92a.

The results, as shown in Table 2, demonstrate that the subject topcoat has substantially longer resistance to rubbing and retains its hardness under accelerated coating softening testing when compared to a similar topcoat formulation containing no aqueous aliphatic epoxy dispersant.

TABLE 2

| EXAMPLE | NUMBER OF DOUBLE RUBS TO FAILURE | COATING HARDNESS BEFORE DOUBLE RUBS | COATING HARDNESS AFTER 60 DOUBLE RUBS |
|---|---|---|---|
| Example 2 | >200 | 2 H | 2 H |
| Comparative Example C4 | 60 | 2 H | H |

By the term "weatherability" it is meant performance of stain, topcoat, or stain/topcoat systems in exterior exposure, for example corresponding to the ASTM G53–88 test. By the term "translucent" it is meant a product or film through which newspaper can be easily read through a 1 mm thickens. By the term "opaque" it is meant a product or a film that appears milky to the unaided eye for a maximum of two layers totalling 10–100 µm thickness. By the term "non-porous surface" it is meant a substrate having a surface having a mineral spirit uptake of about 0–0.15 weight percent, based on the weight of the substrate.

From the above description of the invention, those skilled in the art will perceive improvements, changes and modifications. Such improvements, changes and modifications within the skill of the art are intended to be covered by the appended claims.

What is claimed is:

1. A finished, weatherable door, comprising:
   a) a door having a first face and a second face, at least one of said faces comprising a thermoset and/or thermoplastic skin;
   b) at least one skin having thereon a pigmented stain; and
   c) a transparent topcoat superficial to the pigmented stain, said topcoat comprising the dried product of an aqueous composition comprising:
      i) an acrylic polyurethane latex;
      ii) an emulsion of one or more curable organopolysiloxanes;

iii) a weatherbility agent having a functional group that is reactive with carboxylate functional sites; and iv) water.

2. The door of claim 1 wherein said skin is non-porous.

3. The door of claim 1 wherein the topcoat has a dry thickness of 10–150 μm.

4. The door of claim 1 wherein said weatherability agent is selected from the group consisting of epoxides, alcohols, aziridines, blocked isocyanates, divalent metals with weakly bonded ligand complexes which are soluble in polar solvents miscible with water, and mixtures thereof.

5. The door of claim 4 wherein said weatherability agent comprises an aqueous aliphatic epoxy emulsion.

6. The door of claim 4 wherein said weatherability agent is selected from the group consisting of tetraglycidylmethylenedianiline, bisphenol A diglycidyl ether, and mixtures thereof.

7. The door of claim 4 wherein said weatherability agent comprises an aqueous aliphatic epoxy emulsion which is present in said topcoat in an amount from about 1% to about 25%, by weight, based on the weight of said topcoat, and comprises by weight, from about 40% to about 60% solids, based on the weight of said emulsion.

8. The door of claim 7 wherein said acrylic polyurethane latex is present in said composition in an amount from about 30% to about 45%, by weight, based on the weight of said composition, and comprises by weight, from about 37% to about 40% solids, based on the weight of said latex.

9. The door of claim 8 wherein said emulsion of one or more curable organopolysiloxanes comprises a microemulsion of one or more curable alkoxy-alkyl-functional organopolysiloxanes, said microemulsion being present in said composition in an amount, by weight, from about 3% to about 10%, based on the weight of said composition, said organopolysiloxanes being present in said microemulsion in an amount from about 42% to about 46%, based on the weight of the microemulsion.

10. The door of claim 9 wherein said water is present in said composition in an amount from about 35% to about 50%, by weight, based on the weight of said composition.

11. The door of claim 1 wherein said pigmented stain comprises, prior of evaporation of solvent, in percent by weight based on the total weight of said pigmented stain:

i) from about 15% to about 35% of one or more pigments;

ii) from about 20% to about 45% of a resin binder comprising dicyclopentadiene-modified drying oil; and iii) from about 20% to about 40% of at least one volatile solvent.

* * * * *